US008227024B2

(12) United States Patent
Borovkov et al.

(10) Patent No.: US 8,227,024 B2
(45) Date of Patent: Jul. 24, 2012

(54) METHOD OF PRODUCING POLYMER LAYER WITH LATENT POLARIZED IMAGE

(75) Inventors: Gennadiy Borovkov, Minsk (BY); Alexei Pavlov, Minsk (BY); Vadim Shevko, Minsk (BY); Yuriy Emelyanov, Minsk (BY)

(73) Assignee: A.T.B. Latent Export Import Ltd, Richon-Le-Zion (IL)

( * ) Notice: Subject to any disclaimer, the term of this patent is extended or adjusted under 35 U.S.C. 154(b) by 995 days.

(21) Appl. No.: 11/886,351

(22) PCT Filed: Jun. 9, 2005

(86) PCT No.: PCT/BY2005/000005

§ 371 (c)(1), (2), (4) Date: Jun. 23, 2008

(87) PCT Pub. No.: WO2006/005149

PCT Pub. Date: Jan. 19, 2006

(65) Prior Publication Data

US 2008/0286452 A1 Nov. 20, 2008

(30) Foreign Application Priority Data

Mar. 15, 2005 (BY) ................................ a 20050242

(51) Int. Cl.

*B41M 5/00* (2006.01)
*G02B 5/30* (2006.01)
*B44F 1/12* (2006.01)

(52) U.S. Cl. ......... 427/145; 427/7; 427/163.1; 235/380; 359/492.01

(58) Field of Classification Search .............. 427/7, 145; 428/1.2, 1.3, 1.1; 235/380, 381, 382
See application file for complete search history.

(56) References Cited

U.S. PATENT DOCUMENTS

| | | | |
|---|---|---|---|
| 4,659,112 | A | 4/1987 | Reiner et al. |
| 5,284,364 | A | 2/1994 | Jain |
| 5,389,698 | A | 2/1995 | Chigrinov et al. |
| 6,124,970 | A | 9/2000 | Karassev et al. |
| 6,618,116 | B1 | 9/2003 | Murata et al. |
| 6,753,952 | B1 | 6/2004 | Lawrence et al. |

FOREIGN PATENT DOCUMENTS

| | | | |
|---|---|---|---|
| EP | 1189079 | | 3/2002 |
| EP | 1189079 | A1 * | 3/2002 |
| GB | 2328180 | | 2/1999 |
| RU | 2165360 | | 4/2001 |
| WO | WO 01/00418 | | 1/2001 |

* cited by examiner

*Primary Examiner* — Dah-Wei Yuan
*Assistant Examiner* — Jose Hernandez-Diaz
(74) *Attorney, Agent, or Firm* — Law Office of Sergei Orel, LLC

(57) ABSTRACT

The present invention provides a method of producing a latent polarized image having high contrast characteristics with no apparent contours or traces of the image under normal visualization. A polymer solution is prepared in an organic solvent, and then applied onto a light-reflecting substrate. The polymer layer is dried to produce an optically isotropic polymer layer and anisotropic images are formed on the polymer layer. The polymer solution's concentration is from 5 to 30% by weight, and the images are formed by application of micro-lines by thermo-mechanical means, having depths from 1 to 3 μm and being separated from one another by 4 to 6 μm at a process rate from 10 to 50 m/min. The thermomechanical means operates at a temperature that is 10 to 60% less than the polymer melting/disintegration temperature and contacts the polymer layer to form micro-lines for 0.015 to 0.650 msec.

5 Claims, No Drawings

METHOD OF PRODUCING POLYMER LAYER WITH LATENT POLARIZED IMAGE

FIELD AND BACKGROUND OF THE INVENTION

The invention is related to polygraphy, and, in particular, to the production of polymer layers with latent images visible in polarized light that can be used as protective marks on various documents, security papers, banknotes as well as for manufacturing of excise documentary stamps, labels, tags and other products of the kind.

At present to prevent forgery of various kinds of products the latter are supplied with some peculiar features that are difficult to reproduce such as watermarks, micro-range printing, embedded metal strips. As a kind of such protection there can also be used optical elements that are capable of varying the polarization of incident light such as holograms, liquid-crystal optical elements as well as polymer layers with latent image visible exclusively in polarized light.

The latter are produced as a rule by varying the anisotropic properties of the separate areas of a polymer layer thus forming a latent image.

The above-described modification can also be provided by selectively varying the thickness of a polymer film by mechanic [U.S. Pat. No. 5,284,364 A, Feb. 8, 1994] or thermal mechanic [U.S. Pat. No. 4,659,112 A, Apr. 21, 1987] means or with the help of laser radiation [GB 2328180 A, Feb. 17, 1999].

Also known are the methods of producing a latent image by means of selective photo-stimulation of a light-sensitive polymer layer [RU 2165360 C1, Feb. 24, 1999, U.S. Pat. No. 6,124,970 A, Sep. 26, 2000, U.S. Pat. No. 5,389,698 A, Feb. 14, 1995].

For example, it is known a method of producing a latent image comprising the steps of treatment of originally light-sensitive anisotropic polymer by the solution containing a photo-activating substance, selective irradiation to form the areas with different anisotropic characteristics as compared to the original ones and then fixing the latent image thus received [U.S. Pat. No. 6,124,970 A, Sep. 26, 2000].

The most closely related to the method filed is a method of producing a polymer layer with a latent polarized image comprising the steps of preparing a 2% polymer solution in an organic solvent, application of said solution on a light-reflecting substrate, further drying to produce an optically isotropic polymer layer and generating there on the said layer of the areas with anisotropic properties by means of irradiation through a mask by a Hg lamp [U.S. Pat. No. 5,389,698 A, Feb. 14, 1995].

However, all of the above-described methods do not provide one of the most important requirements to a polymer layer thus received which enable its further use as a protective mark or a constituent part thereof i.e. no contours or traces of a polarized image being evident when visualized in the usual way. Besides, the products produced by the above-described methods do not have the required stability with regard to UV 20 radiation and high temperatures and have limited field of application.

SUMMARY OF THE INVENTION

It is the aim of the present invention to provide a method of producing a latent polarized image having high contrast characteristics with no contours or traces of said image being evident when visualized in the usual way. This extends the functional possibilities of the finished product while providing its high thermal stability and resistance to UV radiation.

The above-set aim in a described method of producing a polymer layer with a latent polarized image is achieved by means of preparing a polymer solution in an organic solvent, the application of the solution on a substrate, further drying results in the production of an optically isotropic polymer layer and forming on the said polymer layer image generating areas having anisotropic properties, while the concentration of a polymer solution is from 5 to 30% by weight, and the areas having anisotropic properties are generated by a thermomechanical exposure of working body upon a polymer layer by means of application on the said polymer of a layer of micro-lines having the depth from 1 to 3 μm and being separated from one another by the distance from 4 to 6 μm or more, and applied at the rate of the process from 10 to 50 m/min and at the temperature less than the temperature of polymer melting or destruction by from 10 to 60% and the duration of contacting of the working body with, the said polymer layer from 0.015 to 0.650 msec.

The above-described aim can also be achieved by application of micro-lines having the width from 10 to 80 μm and the length from 20 to 100

The above-described aim can also be achieved by means of that prior to application of the micro-lines on an optically isotropic layer, there is additionally applied a mask of thermally stable lacquer.

In the filed method of producing a polymer layer with a latent polarized image there could also be used a wide range of industrially available polymers like polyolefin and its haloid derivatives, other substituted polyolefins, cellulose derivatives, various co-polymers.

As a substrate there could be used PET film 20-40 μm thickness which, if necessary, could hold a reflecting layer. In the latter case a polymer layer is applied from the outside of a reflecting layer.

During implementation of the method filed, when applying a polymer layer on a substrate layer, the polymer macromolecules are in their activated state and are characterized by high mobility which is due to the use of a polymer solution having the concentration from 5 to 30% by weight. This results in the production of an isotropic layer on a substrate layer and makes it possible to provide latent images on the polymer layers having high degree of brittleness. The orientation of such polymers is not possible by means of the prior art methods. The possibility of using brittle polymers extends the functional characteristics of a finished product, in particular, makes it possible to produce a hot-stamping foil using the method filed since such polymers provide a clear-cut transfer of the polymer layer throughout the stamp.

An important characteristic of a protective mark that is the end products of the method filed is that no contours or traces of a polarized image are evident when visualized in the usual way, i.e., the image when not polarized remains invisible. The images generated by the prior art methods as a rule are not fully invisible but barely visible. When the image is generated by micro-lines and, particularly, when the use of a mask is made, there are no visible contours. The image thus received is characterized by higher resolution values and, hence, higher definition and contrast.

The process of generating a polarized image is provided by means of application of micro-lines on the surface of an isotropic polymer layer, the said micro-lines taken on the whole generating a latent image. A thermal mechanic process of application of micro-lines generates oriented optically anisotropic local areas at the deformation spot.

The micro-line dimensions that are comparable to the macromolecule dimensions make it possible to conduct a process with the difference of temperatures between that of polymer melting and that of image application up to 110° C. For example, the melting temperature of a polymer layer is of 210°, while the image is applied at the temperature of 100° C. Due to this it becomes possible to generate latent images on the polymer layers produced on the base of polymers with the destruction temperature of 140° C.

DESCRIPTION OF THE PREFERRED EMBODIMENTS

The method is implemented in the following way.

A 5 to 30% by weight polymer solution in an organic solvent is prepared with the said solvent being chosen to provide proportional applying of a polymer layer on a substrate layer by such traditional methods as a rotogravure method, a meter bar etc. After drying, there is produced an optically isotropic polymer layer. Then a substrate with a polymer layer applied there on is passed through a device wherein the set of microscopic heating elements (having the linear dimensions from 5 to 100 μm) and operated in the on/off control mode are caused to contact said polymer layer under pressure and moving at the speed of from 10 to 50 m/min. The reliable contact between said heating elements and said polymer layer during from 0.015 to 0.650 μsec is provided by the applied pressure which is regulated in such a manner that the depth of micro-lines would make up the value from 1 to 3 μm. The direction of film motion defines the orientation direction inside a micro-line. In the prior art mechanic methods of orientation of polymer films to achieve more stable and efficient results it is necessary to heat a film up to the temperatures that are close to the temperature of polymer softening. According to the method filed, the temperature of the heating elements is substantially lower than the polymer softening temperature, and dependent on the polymer type, this difference makes up from 10 to 60%. For example, the softening temperature of fluoroplastic makes up about 160° C., while the process of image application can be conducted at 100° C. This is facilitated due to the fact that the deformation of a polymer layer by the heating element during application of a micro-line is performed within highly limited surface area wherein the bonds of, the polymer macromolecules are weaker than inside the space of a polymer matrix. Short operation time and limited operation area decrease the energy scattering throughout the polymer space, while a certain contribution is provided by the heat output of the friction forces, the latter to a certain extent being controlled by pressing of the heating elements on the polymer layer. When in the on position the heating element carries away the polymer macromolecules, thus facilitating stretching out of the polymer macromolecules in the direction of the film motion. However, the direction of an electric dipole moment defining an optical orientation of a polymer layer is dependent on the structure of a polymer molecule, and for the method described it may not coincide with the direction of the mechanical orientation as e.g. with polystyrene. The directions of optical and mechanical orientations are coinciding in the polymers with the linear-type macromolecules, e.g. for fluoroplastic including TEFLON. The micro-lines used in industrial technique have the width of 80 μm or 40 μm and the length up to 100 μm. The permissible thickness of the polymer layers for the method filed makes up from 3 μm and more.

It is possible to generate a latent image by means of applying a mask of thermally stable lacquer non-oriented according to a method filed on an isotropic polymer and further applying the micro-lines throughout the surface of the polymer layer. The mask prevents the possibility of orientation of the polymer layer positioned thereunder, this in its turn resulting in the generation of a polarized image.

Finished products with a latent polarized image generated by the above-described method when viewed through a circular-type polarizer are characterized by a high-contrast image of white or light-blue color on the dark-blue background with no traces or contours of said image being evident when visualized in the usual way.

Example 1

A 15% by weight solution of low-substituted cellulose cinnamate in dimethyl formamide is prepared. A low-substituted cellulose cinnamate is produced by mixing cellulose ether with cinnamic and acetic acids with the degree of substitution for acetic acid being of 0.3 and that for cinnamic acid being of 0.2. The solution thus prepared is applied on the metallized film surface by means of a roller or wire-wound meter bar having the wire diameter and hence the wire pitch of 40 μm. After drying during 1 min by hot air at the temperature of 155° C., on the reflecting layer there is formed an optically isotropic polymer layer having the thickness of 5 μm. Then by means of a computer-controlled plotter supplied with a metal needle having the total area of a contact pad of 40 μm and heated to the temperature of 100° C. there is applied a pattern of micro-lines having the depth of 3 μm, the width of 40 μm and the length of 100 μm. The duration of contact is of 0.024 msec and the speed is 10 m/min. The layer thus produced with a latent image applied there on can sustain the temperature of 140° C.

Note: This polymer does not have the melting point and starts decomposing at the temperatures higher than 140° C.

Example 2

Example 2 is similar to example 1 with the exception that after applying a polymer layer the latter is additionally covered with a mask of a thermally stable polymer (having the melting temperature about 200° C.). Then using the plotter them are applied micro-lines throughout the whole surface of a polymer layer. The area covered by a mask remains an optically isotropic one and thus produces a polarized image on the background of an optically anisotropic area.

Example 3

A 10% by weight solution of low-substituted cellulose benzoate with the degree of substitution of hydroxyl groups to benzoate groups from 0.5 to 0.7 is made in dimethyl formamide. This solution is sprinkled by a meter bar or a raster means on the metallized film surface with further drying during 1 min by hot air at the temperature of 155° C. to produce as a result an optically isotropic transparent layer having the thickness of 8 μm with the residue content of solvent from 2 to 5%. Then by means of a computer-controlled plotter supplied with a metal needle having the total area of a contact pad of 40 μm and heated to the temperature of 100° C. there is applied a pattern of micro-lines having the depth of 3 μm, the width of 40 μm and the length of 100 p.m. The duration of contact is of 0.024 msec and the speed is 10 m/min. The layer thus produced with a latent image applied there on can sustain the temperature of 140° C.

Note: This polymer does not have the melting point and starts decomposing at the temperatures higher than 140° C.

Example 4

An 18% solution of suspension polystyrene having an average molecular weight of 260000 in ethyl acetate is prepared. This solution is sprinkled by a meter bar or a raster means on the metallized film surface with further drying during 1 min by hot air at the temperature of 155° C. to produce as a result an optically isotropic transparent layer having the width of 6 μm with the residue content of solvent from 3 to 7%. Then by means of a computer-controlled plotter supplied with a metal needle having the total area of a contact pad of 40 μm and heated to the temperature of 100° C. there is applied a pattern of micro-lines having the depth of 3 μm, the width of 40 μm and the length of 100 μm. The duration of contact is of 0.024 msec and the speed is 10 m/min. The layer thus produced with a latent image applied there on can sustain the temperature of 105° C.

A peculiar feature of this polymer is the resultant optical anisotropy in the direction that is perpendicular to the motion of the needle.

Example 5

A 12% by weight solution of polyethylene terephthalate having an average molecular weight of 25000 in a strong acid is prepared. This solution is sprinkled by a meter bar or a raster means on the metallized film surface with further drying during 1 min by hot air at the temperature of 155° C. to produce as a result an optically isotropic transparent layer having the thickness of 5 μm with the residue content of solvent from 3 to 7%. Then by means of a computer-controlled plotter supplied with a metal needle having the total area of a contact pad of 40 μm and heated to the temperature of 100° C. there is applied a pattern of micro-lines having the depth of 3 μm, the width of 40 μm and the length of 100 μm. The duration of contact is of 0.024 msec and the speed is 10 m/min. The layer thus produced with a latent image applied there on can sustain the temperature of 180° C.

The polymer layers with a latent image produced in accordance with a method filed are characterized by high contrast of the image thus received no contours or traces of said image being evident when visualized in the usual way as well as by resistance to UV radiation and high thermal stability.

Example 6

Producing Self-Adhesive Protective Mark with Latent Image

A polymer layer with a latent image made under example 1 is applied on a metallized layer of polyethylene terephthalate film (PET film) 40 micron thickness can be used for production a self-adhesive protective mark. Thereto the layer of adhesive with residual tack is applied on the surface of a PET film using DISPERCOL emulsion, a plotter No 12 supplied with a metal needle and drying temperature 75° C. The layer of adhesive 8-10 micron thickness is produced and covered with release coating paper. Self-adhesive protective marks with latent images are produced by means of a cutter plotter or a blanking machine from the multilayer material.

Example 7

Producing Multilayer Material for Applying a Polymer Layer with a Latent Image

A polymer layer is applied on the PET film 20 micron thickness and generated a latent image under example 4. Thermosetting adhesive THERMODEX E/V 143 skin is applied on the polymer layer with latent image. The drying temperature is 50° C. The applying speed is 20 m/min. The thickness of adhesive layer is 4-5 μm.

The multilayer material thus prepared is used for roll-on or stamping of the polymer layer with latent image on the reflecting surface of labels, tags, stamps, protective marks etc. The temperature of roll-on is 90-130° C.

Example 8

Producing Multilayer Material for Applying a Polymer Layer with Latent and Holographic Images According to example 4, a latent image is produced on the basis of PET film 20 micron thickness. Adhesive with residual tack DEXCOL E-158 is applied on a polymer layer with a latent image and then holographic foil with an image is rolled using a laminator and the layer of foil is removed. The multilayer material which is produced consists of the PET film, a polymer layer with a latent image and a layer with a holographic image. The thermosetting adhesive THERMODEX E/V 143 skin 4-5 micron thickness is applied on thus prepared material from the outside the layer with holographic image.

Example 9

Producing Multilayer Material for Applying a Polymer Layer with a Latent Image and a Translucent Reflective Layer A polymer layer is applied on PET film 20 micron thickness and produced under example 4 with a latent image, and then adhesive DEXCOL E-158 is applied on the polymer layer with a latent image and rolled a translucent reflective layer using a laminator under example 8. The multilayer, material which is produced consists of the PET film, a polymer layer with a latent image and a translucent reflective layer. Thermosetting adhesive THERMODEX E/V 143 skin 4-5 micron thickness is applied on the mentioned material outside the translucent reflective layer.

The material produced in such a way is used for applying a latent image combined with the translucent reflective layer by means of lamination and hot stamping.

Example 10

Producing Self-Adhesive Labels, Protective Marks Contained Latent and Holographic Images The material thus prepared under example 8 is rolled on self-adhesive material using a laminator at the temperature of 120-150° C. and the speed is 5-10 m/min. and the layer is removed (PET film 20 micron). Then protective marks are cut by means a cutting plotter or a blanking machine. A latent image is viewed through a circular type polarizer film.

The invention claimed is:

1. A method of producing a polymer layer with a latent polarized image including the steps of preparing a polymer solution in an organic solvent, the application of said solution on a light-reflecting substrate, drying said solution resulting in the production of an optically isotropic polymer layer and producing there on the said polymer layer of image generating areas having anisotropic properties, wherein the concentration of a polymer solution is from 5 to 30% by weight, and the areas having anisotropic properties are generated by the operation of a thermomechanical means upon the polymer layer by application on said polymer layer of micro-lines having the depth from 1 to 3 μm, said lines being separated from one another by the distance from 4 to 6 μm or more and the application rate of said lines is from 10 to 50 m/min, wherein the temperature of the thermomechanical means being less than the temperature of polymer melting or decomposition by from 10 to 60% and the duration of contacting of the thermomechanical means with said polymer layer is from 0.015 to 0.650 msec.

2. A method as in claim 1, wherein the micro-lines applied have the width from 10 to 80 μm and the length from 20 to 100 μm.

3. A method as in claim 1, wherein prior to application of the micro-lines on an optically isotropic layer there is additionally applied a mask of thermally stable lacquer.

4. A security label comprising: a sequentially disposed metallic light reflecting substrate and a optically isotropic polymer, characterized in that it contains a latent polarized image formed by optically anisotropic areas on the optically isotropic polymer layer, said areas having been generated by the operation of a thermomechanical means on said polymer layer, said layer having micro-lines having depth from 1 to 3 microns, and being separated from each other by the distance from 4 to 6 microns or more and a width of from 10 to 80 μm, and the length from 20 to 100 μm where said micro-lines have been created by said thermomechanical means operating at a line speed of the substrate containing said polymer layer relatively to thermomechanical means from 10 to 50 m/min, the temperature of the thermomechanical means is equal to or less than 90% of the polymer layer's melting temperature or decomposition temperature as measured in degrees Celsius, and the contact time of the thermomechanical means with said polymer layer is from 0.015 to 0.650 milliseconds.

5. A method as in claim 2, wherein prior to the application of the micro-lines on an optically isotropic layer there is additionally applied a mask of thermally stable lacquer.

* * * * *